Dec. 30, 1952 — T. M. TEMPLEMAN — 2,623,940
PRESSURE WARNING DEVICE

Filed Dec. 15, 1948 — 2 SHEETS—SHEET 1

INVENTOR.
THOMAS M. TEMPLEMAN
BY
-ATTORNEY-

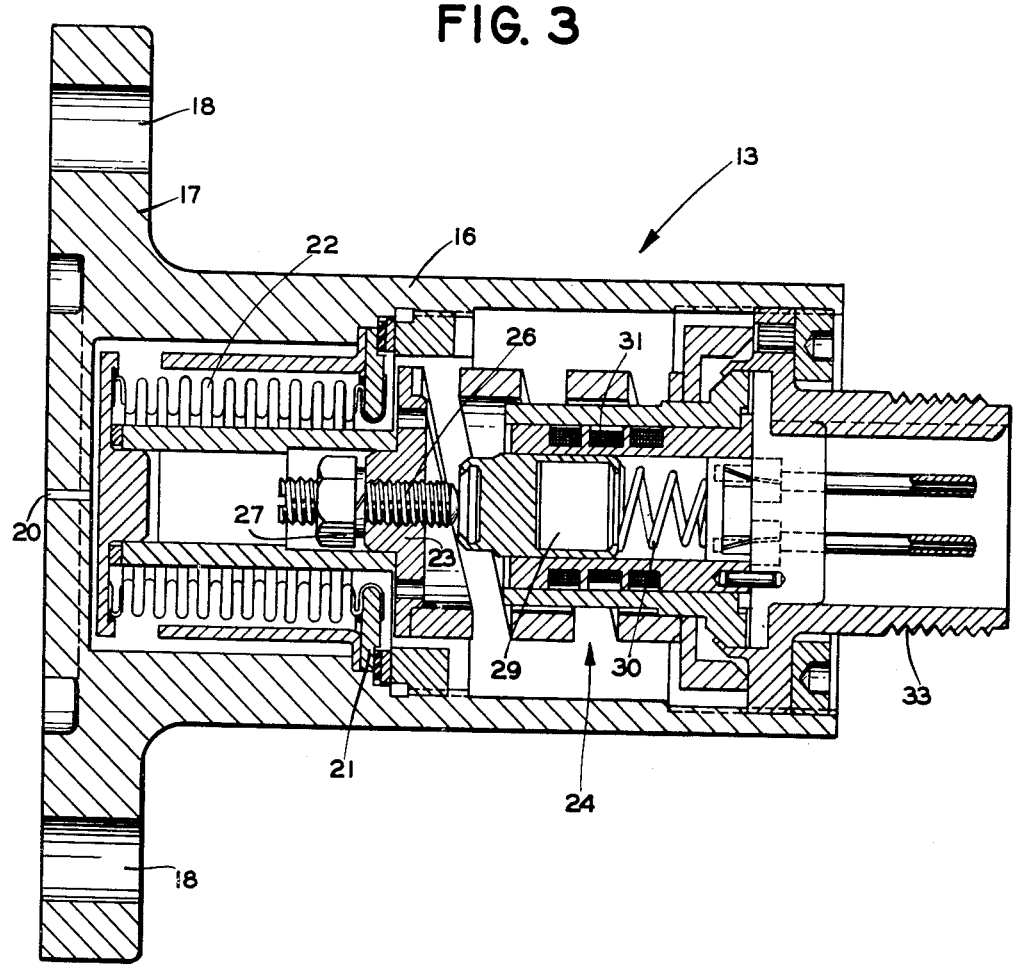

Patented Dec. 30, 1952

2,623,940

UNITED STATES PATENT OFFICE 2,623,940

PRESSURE WARNING DEVICE

Thomas M. Templeman, Miami Springs, Fla., assignor to Bendix Aviation Corporation, Teterboro, N. J., a corporation of Delaware Application December 15, 1948, Serial No. 65,375

6 Claims. (Cl. 177—380)

The present invention relates to warning and indicator units, and more particularly to a pressure warning and indicating transmitter unit for high speed engines.

In the operation of high speed aircraft engines it is necessary to provide an indication at all times of the pressure of the circulating cooling fluid of the engine or engines. In the past, indicators have been provided to show the oil pressure, while other units have been provided to give an aural or visual signal when the pressure has reached a dangerous or abnormal level; the warning units being provided inasmuch as the pressure indicators have been overlooked in the maze of dials and indicators now complementing modern aircraft.

The indicating units and warning units that have been provided required separate transmitting units. Normally the oil pressure transmitter was mounted directly on the engine, while the warning signal transmitter was mounted on the fire wall. The warning unit transmitter required considerable tubing to connect the unit to the engine oil pressure. This introduced the possibility of oil leakage and constituted a dangerous fire hazard.

It is therefore an object of my present invention to provide an oil pressure warning and indicating transmitter unit which is mounted directly on the engine eliminating the hazards of former installations.

A further object of my invention is to provide a transmitter unit of the character indicated in which the pressure transmitter and the warning switch are interchangeable to provide a unit by which either pressure indications or warning signals are provided, or both.

A further object of this invention is to provide a novel pressure switch for the transmitter indicated in which positive and accurate actuation is obtained in response to a predetermined pressure for actuating an electrical circuit.

Other objects of my invention will in part be obvious and in part hereinafter pointed out.

Figure 1:
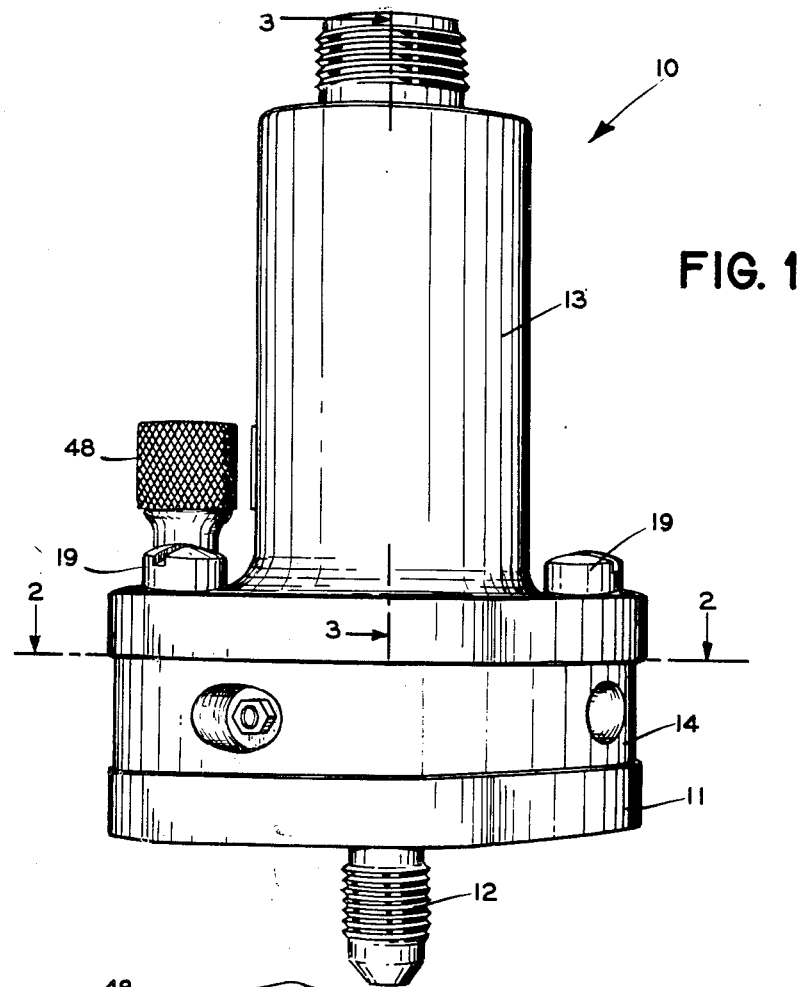
Figure 2:
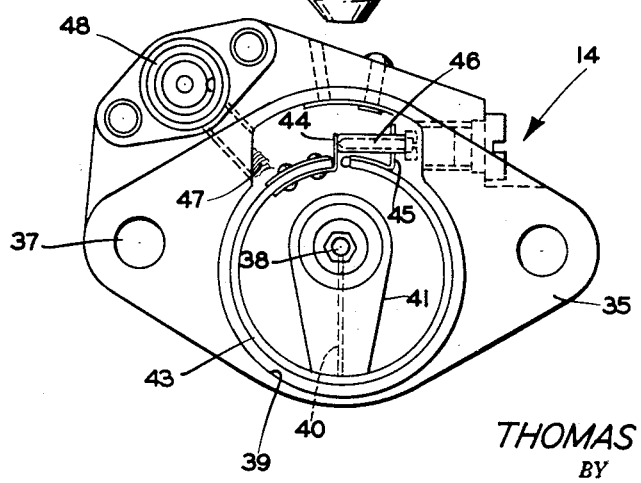

In the accompanying drawings forming a part of this specification in which one of the various possible illustrative embodiments of my invention is shown, and wherein similar reference characters designate corresponding parts throughout the several views, Fig. 1 is an elevational view of a pressure warning and indicating transmitter unit, Fig. 2 is a plan view of a novel pressure switch taken along the line 2—2 of Fig. 1, while Fig. 3 is a sectional view taken along the 3—3 of Fig. 1, portions of which are shown in elevation.

Referring now in detail to the drawings, the numeral 10 designates the complete warning and indicating transmitter unit embodying the invention. The unit 10 is mounted directly onto the engine by means of a flange 11 provided with a screw fitting 12 adapted to be threaded into the engine block (not shown) and provided with a through opening (not shown) to deliver the oil to said unit. The transmitter unit 10 is composed of two units, an oil pressure transmitter 13 and a pressure switch 14.

The pressure transmitter 13 (Fig. 3) is enclosed in a cylindrical housing 16 having a base portion 17 flanged to mate with the mounting flange 11. The flange portion 17 is provided with through openings 18 to permit assembly of the units as by the screws 19 fixed therethrough and threaded into the mounting flange 11.

The cylindrical housing 16 is provided with a through opening 20 in the base portion thereof which is, as will hereinafter be apparent, coextensive with the opening in the screw fitting 12. Within the enclosure 16 and integral with a suitable bracket 21 therein, is a pressure responsive capsule or Sylphon 22 subject on its exterior surface to the oil pressure entering through the opening 20. The inner side of said capsule is subject to atmospheric pressure, the Sylphon sealing the upper end of the housing from the pressure source. A plate 23 is provided on the Sylphon 22 for operating a linear inductive device generally designated by the numeral 24. The plate 23 is provided with a screw 26 and a nut 27, the end of the screw abutting the core magnet 29 of the Magnesyn 24. The core 29 is resiliently biased by a spring 30 within the coil structure 31 of the inductive device against the screw 26. Circuit connections for the inductive device windings are made through the pronged socket arrangement 33 fixed to the upper end of the enclosure 16.

The oil under pressure entering the opening 20 will compress and permit expansion of the Sylphon 22 of the pressure transmitter 13. The expansion and contraction of the capsule will move the plate and screw 26 longitudinally within the housing to move the core of the inductive device. The position occupied by the core within the field winding 31 will provide an electric signal for operating a suitable pressure indicating instrument at a remote point. The desired value of the signals developed by the inductive device may be varied by adjustment and fastening of the screw 26 and nut 27.

Referring now to Fig. 2 in which the novel pressure switch 14 is illustrated, the switch is enclosed in a housing 35 having the general shape of the flange 11. The housing 35 is provided with openings 37 which register with the openings 18 of the pressure transmitter unit for the purpose of assembling the unit as shown in Fig. 1. The housing 35 is provided with a small port 38 which is coextensive with the opening in the screw fitting 12. The port 38 is concentric within a circular recess 39 provided within the housing 35. A vent 40 in a support on 41 fixed within the recess 39 registers with the port 38. Fixed to arm 41 at its midpoint is a Bourdon tube 43, the vent 40 registering with the interior of said tube. The two ends of the Bourdon tube lie in an arcuate position within the recess 39. One end of the tube 43 is provided with a contact plate 44 while the other end of said tube is provided with a small bracket 45 supporting a screw contact 46. The contact plate 44 is connected by a pigtail 47 to an electrical socket connection 48 while the contact screw 46 is grounded.

The oil pressure entering through the opening in the screw fitting 12 will permit the Bourdon tube 43 to expand and contract by virtue of the ports 38 and 40 connecting the same to the source of pressure. The contraction of the Bourdon tube will permit the contact screw 46 to engage the contact plate 44 to complete an electrical circuit to an aural or visual warning device. The pressure at which the warning circuit is made may be adjusted by turning the screw 46 within its supporting bracket 45.

It will be apparent that by the construction herein proposed for the unit 10, a pressure transmitting unit and a warning unit have been combined into a single instrumentality. It is possible with the unit as described to provide only an oil pressure transmitter by unscrewing the assembling screws 19, removing the warning unit 14 and replacing the pressure transmitter and fastening the same on the flange 11. It is also possible to remove the pressure transmitter 13 from the warning unit 14 and provide a cover plate for the warning unit thus providing only the warning unit portion of the herein described transmitter. A unit having the interchangeable parts described is extremely desirable in satisfying the requirements of any particular aircraft. As is often the case an indication of the oil pressure is sometimes sufficient for the proper operation of the engine and in other instances a warning as to a particular oil pressure may be sufficient. Generally, however, an indication as to oil pressure and a warning signal when the pressure reaches a predetermined value is required for the proper maintenance and operation of high speed engines.

It will thus be seen that there is provided a novel unit in which the several objects of this invention are achieved and which is well adapted to meet the conditions of practical use.

As various embodiments of the above invention may be made, and as various changes might be made in the embodiment herein described, it will be understood that all matter herein set forth or shown in the accompanying drawings is to be interpreted as illustrative and not in a limiting sense.

Having thus described my invention, I claim as new and desire to secure by Letters Patent:

1. A pressure warning and indicating transmitter comprising a mounting flange having an opening therein adapted to be connected to a source of pressure, a housing having the general configuration of said flange removably fixed thereto and having an opening therein registering with the opening in said flange, a pressure responsive member within said housing connected to the opening therein, a switch actuated by said pressure responsive member when the pressure of said pressure source reaches a predetermined value, a second housing having a mounting plate of the general configuration of said flange and said first housing removably fixed to said flange, said second housing having an opening registering with the openings in said first housing and said flange, a pressure responsive member in said second housing, and means actuated by the last said pressure responsive member for developing an electrical signal corresponding to the pressure of said pressure source.

2. A pressure warning and indicating transmitter comprising a mounting flange having an opening therein adapted to be connected to a source of pressure, a housing having the general configuration of said flange removably fixed thereto and having an opening therein registering with the opening of said flange, a Bourdon tube within said housing connected to the opening therein, a switch actuated by said Bourdon tube when the pressure of said pressure source reaches a predetermined value, a second housing having a mounting plate of the general configuration of said flange and said first housing removably fixed to said flange, said second housing having an opening registering with the openings of said first housing and said flange, a pressure responsive member in said second housing, and means actuated by said pressure responsive member for developing an electrical signal corresponding to the pressure of said pressure source.

3. A pressure warning and indicating transmitter comprising a pair of compartments formed by separable housings secured to one another, a port extending through one compartment in communication with a pressure source, a pressure member in said one compartment connected to said port and adapted to be subjected to the pressure of said source, a switch actuated by said pressure member when the pressure of said source attains a predetermined value, said other compartment being connected to said port in communication with said pressure source, a second pressure member in said last-mentioned compartment, and means responsive to said pressure member for developing a signal corresponding to the pressure of said source.

4. A pressure warning and indicating transmitter comprising a pair of compartments formed by separable housings secured to one another, one of said compartments being subjected to the atmosphere and having a port extending therethrough, said port being in communication with a pressure source, a pressure member in said one compartment connected to said port and adapted to be subjected to the pressure of said source, a switch actuated by said pressure member when the pressure of said source attains a predetermined value, said other compartment being connected to said port in communication with said pressure source, a second pressure member in said last-mentioned compartment, and means responsive to said pressure member for developing a signal corresponding to the pressure of said source.

5. A pressure warning and indicating transmitter comprising a mounting flange having an opening therein in communication with a pressure source, a housing removably secured to said mounting flange, a pressure member in said housing, a port formed in said housing in communication with said opening and said pressure member, a switch actuated by said pressure member when the pressure source attains a predetermined value, a second housing removably secured to said first housing, a pressure member within said second housing, a second port formed in said second housing in communication with said opening and said first-mentioned port and connected for actuating said last-mentioned pressure member, and means responsive to said last-mentioned pressure member for developing a signal corresponding to the pressure of said source.

6. A pressure warning and indicating transmitter comprising a flange member having an opening therein in communication with a pressure source, a housing removably secured to said flange member and having a port in communication with said opening and registering therewith, a pressure member in said housing, a rigid member having a vent formed therein communicating with said port and said pressure member, a switch connected for actuation by said pressure member when the pressure of said source attains a predetermined value, a second housing secured to said first housing and having a port formed therein in communication with the port in said first housing, a pressure member in said second housing and connected for actuation by the pressure of said source, and means responsive to the actuation of said last-mentioned pressure member for developing a signal corresponding to the pressure of said source.

THOMAS M. TEMPLEMAN.

REFERENCES CITED

The following references are of record in the file of this patent:

UNITED STATES PATENTS

| Number | Name | Date |
| --- | --- | --- |
| 1,414,007 | Berwick | Apr. 25, 1922 |
| 1,718,494 | Schurig | June 25, 1929 |
| 2,050,629 | Quereau | Aug. 11, 1936 |
| 2,058,256 | Pike | Oct. 20, 1936 |
| 2,371,669 | Baak | Mar. 20, 1945 |
| 2,464,612 | Rich | Mar. 15, 1949 |
| 2,466,071 | Barnes | Apr. 5, 1949 |
| 2,484,022 | Esval | Oct. 11, 1949 |
| 2,510,785 | Potts et al. | June 6, 1950 |